United States Patent

Ng et al.

[11] Patent Number: 5,837,908
[45] Date of Patent: Nov. 17, 1998

[54] TORQUE AND POSITION SENSOR

[75] Inventors: Harris Ng, Royal Oak, Mich.; Lawrence T. Rupert, Carthage; Mohan J. Devsam, Hamilton, both of Ill.

[73] Assignee: Methode Electronics, Inc., Chicago, Ill.

[21] Appl. No.: 701,280

[22] Filed: Aug. 22, 1996

[51] Int. Cl.⁶ ..................................................... G02L 3/02
[52] U.S. Cl. ................... 73/862.326; 73/862.325
[58] Field of Search ....................... 73/862.325, 862.191, 73/862.321, 862.326, 862.324

[56] References Cited

U.S. PATENT DOCUMENTS

| | | |
|---|---|---|
| 5,009,386 | 4/1991 | Stokes et al. . |
| 5,168,756 | 12/1992 | Hulsing, II . |
| 5,195,382 | 3/1993 | Peilloud ............................ 73/862.321 |
| 5,369,583 | 11/1994 | Hazelden ....................... 73/863.326 X |
| 5,467,020 | 11/1995 | Boyette, Jr. et al. . |
| 5,513,536 | 5/1996 | Reger et al. ....................... 73/862.191 |
| 5,524,485 | 6/1996 | Bernard et al. ................ 73/862.191 X |

Primary Examiner—Elizabeth L. Dougherty
Attorney, Agent, or Firm—Jeffrey H. Canfield

[57] ABSTRACT

A combination torque and position sensor is provided for measuring the torque applied to a rotatable shaft, and measuring the position of the shaft as it is rotated. The combination sensor includes a fixed disc formed of a non-conducting insulating material with a circular resistive position track and a circular resistive torque track disposed around a surface of the disc. A first input voltage supply contact and a first ground contact in fixed relation to one another and are held in rotatable contact with said torque track. A torque signal output contact also held in rotatable contact with the torque track is positioned between the first voltage supply contact and the first ground contact such that torque applied to the shaft alters the relative position between the torque output contact and the first voltage supply and first ground contacts. The torque output contact provides an output voltage signal proportional to the amount of torque applied to said shaft. A second input voltage supply contact and a second ground contact are held in rotatable contact with the position track. At least one position signal output contact is electrically connected to the position track and provides an output voltage signal proportional to the angular position of said shaft.

15 Claims, 6 Drawing Sheets

5,837,908

TORQUE AND POSITION SENSOR

BACKGROUND OF THE INVENTION

The present invention relates to a combination electronic torque and position sensor for measuring the angular position of a rotatable shaft, and for measuring the amount of torque being applied to the shaft.

A need for torque and/or position sensors has arisen in applications such as electric power steering systems in automobiles where a reliable and cost effective torque and position sensor is needed. The present invention provides such a device for measuring the position and torque in a shaft fitted with a torsion bar system as is well known in the art. In such systems, the output shaft on which torque and position are to be measured is split into two sections with a torsion bar fitted therebetween. Torque applied to one end of the shaft causes the first shaft segment to rotate relative to the second shaft segment due to the compliance of the torsion bar. Torque is calculated by measuring the relative motion between the two shaft segments.

Like the torque and position sensor of the present invention, past sensors employed a combination of rotors attached to different shaft segments, and a stationary disc for receiving data signals. Torque was determined by measuring the relative motion between rotors, and position was determined by tracking the position of an electrical contact attached to one of the rotors as the rotor was rotated relative to the stationary disc. To sense torque a arc approximately 15° long made of resistive material was formed on a surface of one of the rotors, a separate arc being formed for each torque signal to be output from the sensor. A voltage signal was then applied to each arc, with a positive potential supplied to one end of the arc, and a ground potential supplied to the other. An output voltage signal proportional to the amount of torque applied to the shaft was developed through a torque contact mounted on the second rotor. The torque contact was mounted such that it physically engaged the resistive arc on the first rotor directly between the positive voltage and ground potential connections. With this arrangement, applied torque caused the first shaft to rotate relative to the second shaft, and the torque contact therefore was moved from the center of the resistive arc either toward the positive potential or toward the negative potential, depending on the direction of the applied torque. This motion along the resistive arc altered the resistance ratio between the input voltage and the torque signal contact, and the torque signal contact and ground, thereby altering the voltage present at the torque signal contact. As the torque signal contact moved closer to the positive voltage reference, for example, the output voltage signal increased, as the torque signal contact moved closer to the ground potential, the output voltage signal decreased. Thus, a voltage signal was generated in proportion to the amount of torque being applied to the shaft.

This past arrangement, however, led to problems during the assembly process. Since torque was being measured between the limits of the two opposite ends of the resistive arcs, it was critical that the torque signal contact was positioned directly in the center of the arc when the sensor was at rest. Because of limitations of the screening process in which the resistive arc was formed on the first rotor, it was impossible to determine exactly where the torque output contact would line up relative to each end of the arc before the rotors were assembled. Thus, the sensor had to be zeroed out after the rotors were assembled. This process involved trimming the edges of the arc until the resistance on each side of the torque signal contact was approximately equal. This process greatly increased the complexity of the assembly process, and therefore greatly increased the cost of the sensors.

The stationary circuit board of the prior devices was formed with a series of conductive tracks on a surface of the circuit board. The conductive tracks provided a means for coupling voltage signals from the rotors to the circuit board so they could be output from the sensor. With regard to torque, a separate conductive track was be supplied for each torque signal generated by the sensor. For example, if two torque signals were to be output from a sensor, two resistive arcs were formed on the first rotor, and two separate torque contacts on the second rotor were held in physical contact with the two arcs to produce two separate torque signals. Each torque contact was then electrically connected to an additional signal contact which was held in rotatable contact with one of the torque signal tracks on the stationary circuit board. Output leads attached to each track provided the torque signals output from the sensor.

The past sensors accomplished position sensing in similar fashion. However, rather than resistive arcs on the rotors, a circular resistive track was formed on the stationary circuit board. A positive voltage signal was applied to one end of the resistive track, and a ground potential applied to the other. Position contacts mounted on one of the rotors were configured to ride over the resistive track as the shaft turned. The position contacts rotated around the resistive track, moving either closer to or further away from the voltage signals attached at either end of the track. Since the position track was formed with a known linear resistance, the angular position of the shaft was determined from the voltage level of the position signal as measured at the position contacts. Like the torque signals, the position contacts on the rotor were connected to additional contacts which engaged conductive tracks on the circuit board. Output leads attached to each of these position tracks provided the position signals output from the sensor. With this arrangement, any number of position signals could be developed, though each additional position signal required two additional rotor contacts and an addition position output track.

A problem with the past generation combination torque and position sensors was their large size, high cost, and the necessity for zero balancing the sensor after the rotors and stationary circuit board were assembled. This last issue further increasing the assembly costs of the device, and giving rise to additional quality issues. The large size of the prior art devices is necessitated by the large number of tracks required on the stator and their physical relationship to the contacts and resistive arcs on the rotors. A prior art device having two torque output signals, and two position signals would require a minimum of ten tracks on the stator, including power tracks, which makes the device too large for many applications. It is possible to make such a device smaller by making the stationary circuit board two sided, however, this requires that the stationary circuit board become another rotor which greatly increases the complexity of the device and further increases assembly costs. Thus, a smaller, less expensive, more reliable combination torque and position sensor is needed.

SUMMARY OF THE INVENTION

In light of the prior art as described above, one of the main objectives of the present invention is to provide a combination sensor for sensing the torque applied to and the angular position of a rotatable shaft.

A further object of the present invention is to provide a smaller, more reliable, and less expensive combination torque and position sensor.

Another objective of the present invention is to provide a combination sensor that is easy to manufacture and assemble.

Still another objective of the present invention is to provide a sensor for measuring the torque applied to a two piece shaft with a compliant torsion bar disposed therebetween.

Yet another objective of the present invention is to provide a sensor that measures torque by monitoring the relative position of input voltage, ground, and output voltage contacts as they simultaneously rotate over a single resistive track.

An additional objective of the present invention is to provide a sensor that measures torque by monitoring the relative position of input voltage, ground, and output voltage contacts as they simultaneously rotate over a single resistive track which does not require zero balancing adjustments to be made after the sensor is assembled.

A further objective of the present invention is to provide a sensor for sensing the angular position of a rotatable shaft wherein position is determined from a single stationary resistive track, position being determined by voltage signals measured at various points around the resistive track.

A still further objective of the present invention is to provide a sensor for sensing the position of a rotatable shaft where a voltage reference and ground reference rotate with the shaft and provide a moving voltage reference and ground reference to a stationary resistive track.

Another additional objective of the present invention is to provide a position sensor for sensing the position of a rotatable shaft wherein a plurality of position signals are produced from a single resistive position track, the signals being identical but for a phase angle difference determined by the location of output contacts connected to the resistive track.

All of these objectives, as well as others that will become apparent upon reading the detailed description of the presently preferred embodiments of the invention below, are met by the rotatable torque and position sensor disclosed herein.

In the presently preferred embodiment a steering column is split into first and second shafts with a compliant torsion bar disposed therebetween. A stationary sensor housing encloses the portion of the shaft encompassing the torsion bar. Within the housing a stationary disc made of cermet, PCB, or some similar insulating material is attached to the housing, and the shaft extends through an aperture in the middle of the disc. Two tracks formed of a resistive ink extend around the aperture on the upper surface of the disk. One track is used for sensing torque, the other for sensing position. The position resistive track has two electrical taps connected to the periphery of the track, diametrically opposed to one another. The taps provide the position output signal for the sensor. Conductive tracks, preferably silver are also formed on the surface of the disc, and provide a voltage reference and ground for the various signals. Two additional conductive tracks provide the output signals for the torque sensing function.

Two rotors are mounted on the rotatable shaft within the housing, one each on each of the two separate rotatable shaft segments. The first rotor has power contacts which slide over the voltage and ground tracks to supply reference voltages for the signals. Additional contacts slide over both the torque resistive track and the position resistive track, supplying both a positive voltage reference and a ground reference for the torque and position signals. The first rotor supplies both the voltage reference and the ground reference to the torque resistive track at two different locations, thereby allowing two separate torque signals to be developed. Only one voltage and one ground signal are supplied to the position resistive track 180° apart. The second rotor carries two contacts which slide along the torque resistive track between both sets of voltage and ground contacts carried by the first rotor. These contacts generate the torque output signals, and are jumpered to another pair of contacts on the second rotor. These second contacts ride along the two torque output tracks on the stationary disc.

In operation, the two rotors rotate in unison as the steering column is rotated. The position contacts sweep around the position resistive track, their position relative to the output taps continually changing as the shaft rotates. Since the distance between the contacts and the taps changes as the steering column rotates, the voltage drop between the contacts and the taps also changes in corresponding fashion, generating a position voltage signal at each tap, the amplitude of the voltage signal corresponding to the position of the steering column. The waveform from each tap appears triangular in shape, increasing linearly as the positive voltage contact approaches the tap, then decreasing linearly as the contact circles away.

The torque signal contacts of the second rotor circle the torque resistive track at a point roughly centered between the voltage reference and ground reference contacts of the first rotor. All six contacts (three for each torque signal being developed) rotate together until torque is applied to the steering column. Torque causes the two shaft segments to rotate relative to one another, causing the torque output contacts of the second rotor to move relative to voltage and ground reference contacts of the first rotor. This change in position alters the resistance ratio between the positive contact and the torque output contact, and the torque output contact and the ground contact. The altered resistance ratio affects the voltage drop between the contacts, and changes the voltage on the torque output contacts. Thus, the voltage available at the torque output contact is proportional to the amount of torque applied to the shaft.

The preferred embodiment disclosed herein describes a combination torque and position sensor as applied to the steering column of an automobile having an electrical power steering system. However, it would be clear to one skilled in the art that the torque and position sensor of the present invention is suitable for use in applications other than electrical power steering systems. Furthermore, it should also be clear that the torque sensing functions and position sensing functions as described herein can be practiced alone or in combination without deviating from the novel aspects of the invention.

DETAILED DESCRIPTION OF THE PRESENTLY PREFERRED EMBODIMENTS

The present invention is for a combination torque and position sensor capable of measuring the torque being applied to a rotatable shaft, and also capable of measuring the angular position of the shaft as the shaft rotates. Although the invention is well suited for use in a variety of applications, in a preferred embodiment the sensor is used as a torque and position sensor in an electrical power steering system where the sensor measures the amount of torque being applied to the rotatable steering column, and also measures the angular position or the steering column as the steering wheel is rotated from side to side. The torque sensing function is configured to measure the torque applied to a steering column comprised of two separate shaft segments coupled by a compliant torsion bar system. The two shaft segments tend to rotate relative to one another as torque is applied to one shaft segment or the other due to the compliance of the torsion bar. Measuring the magnitude and direction of this displacement provides a measure of the magnitude and direction of the torque being applied to the steering column.

Figure 1:
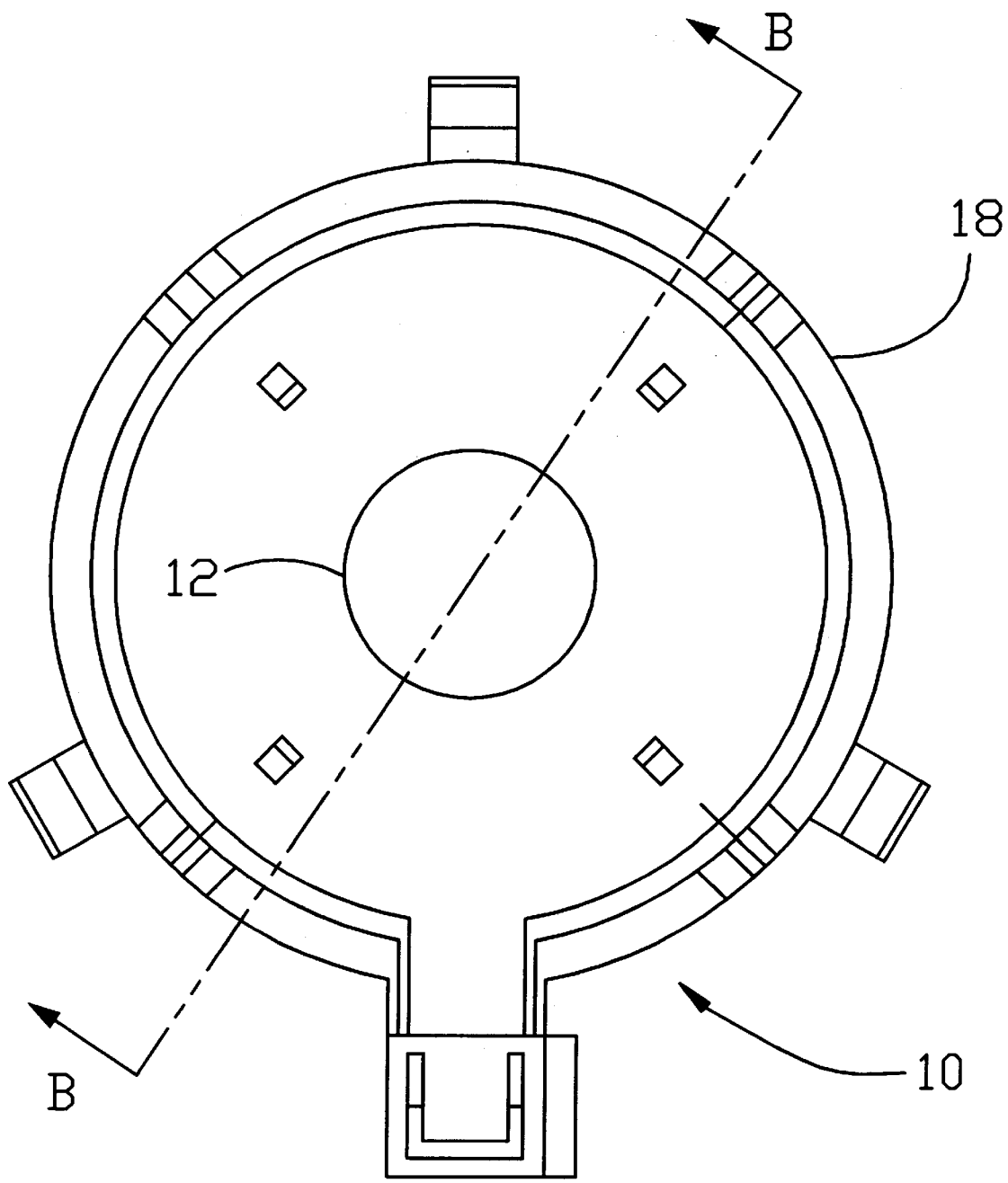
FIG. 1 is a plan view of a combination torque and position sensor according to the present invention.
Figure 2:
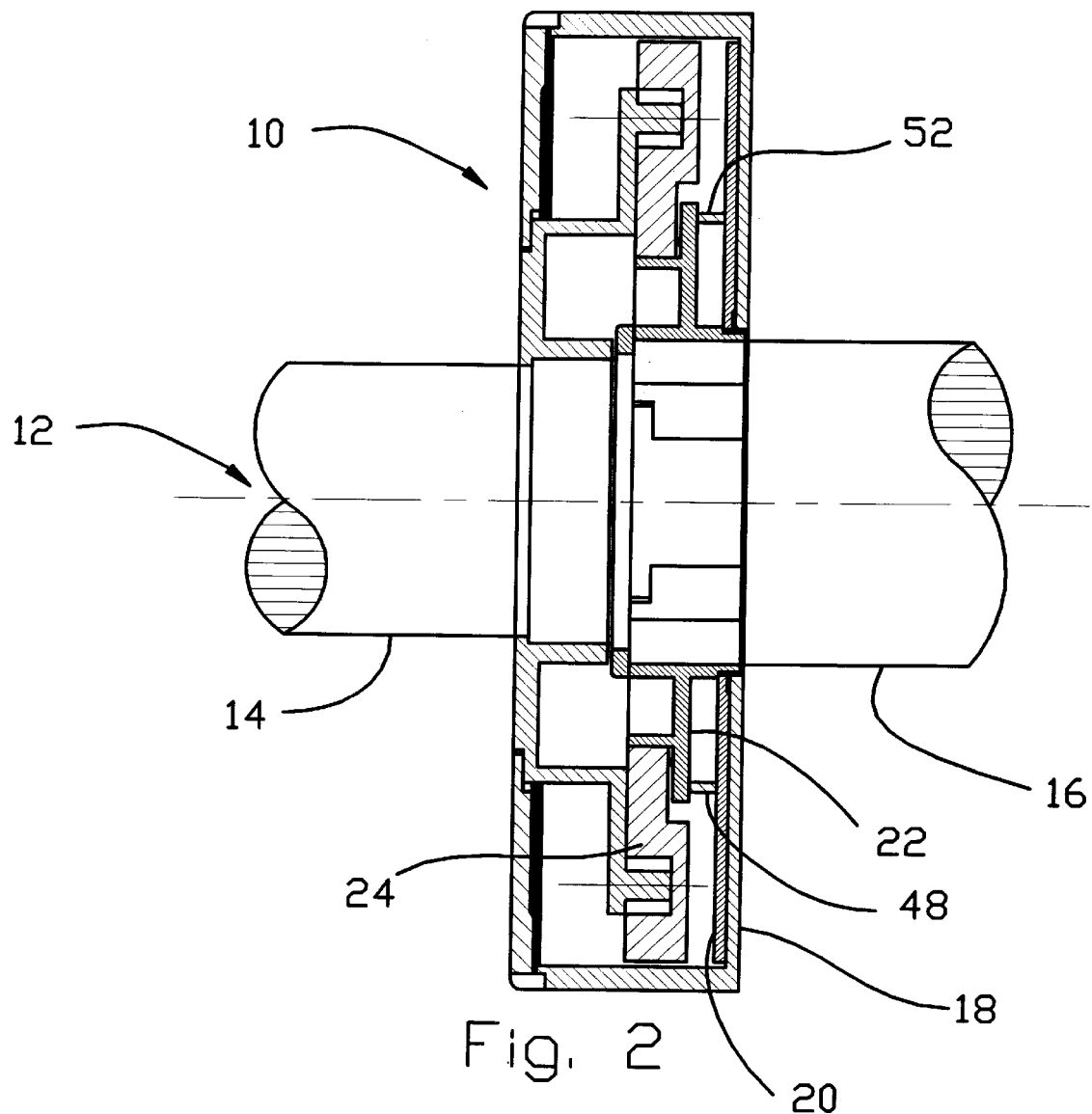
FIG. 2 is a cross sectional view of the combination torque and position sensor of FIG. 1 taken along the line B—B.

Referring to FIG. 1 and FIG. 2, a combination torque and position sensor 10 is shown. Sensor 10 measures the torque being applied to a rotatable steering column 12, as well as the angular position of steering column 12 as the steering wheel (not shown) is turned from side to side. Steering column 12 is split into two separate shafts. The second shaft 14 attaches to the steering wheel at one end, and to first shaft 16 at the other. The two shafts 14, 16 are joined by a compliant torsion bar (not shown), and rotate together as the steering wheel is turned from side to side.

The sensor itself consists of a stationary housing 18, a stationary disc 20, a first rotor 22 attached to first shaft 14, and a second rotor 24 attached to second shaft 16. Steering column 12 passes through stationary housing 18 such that first shaft 14 enters on one side of the housing, and second shaft 16 exits the housing on the other side. In other words, the intersection of shafts 14 and 16 is contained within housing 18. As noted, first rotor 22 is rigidly attached to first shaft 16 and rigidly follows the rotation of first shaft 16. Likewise, second rotor 24 is rigidly attached to second shaft 14, and rigidly follows the rotation of second shaft 14. Stationary disc 20 is mounted to housing 18 and does not rotate with steering column 12. Stationary disc 20 is formed of cermet, PCB, or some other insulating material on which conductive traces can be formed. A number of contacts extend from first and second rotors 22 and 24, and contact the various conductive traces formed on stationary disc 20. In the cross section view of FIG. 2, second torque signal reference contact 48 and first torque ground reference contact 52 are shown contacting stationary disc 20.

Figure 3:
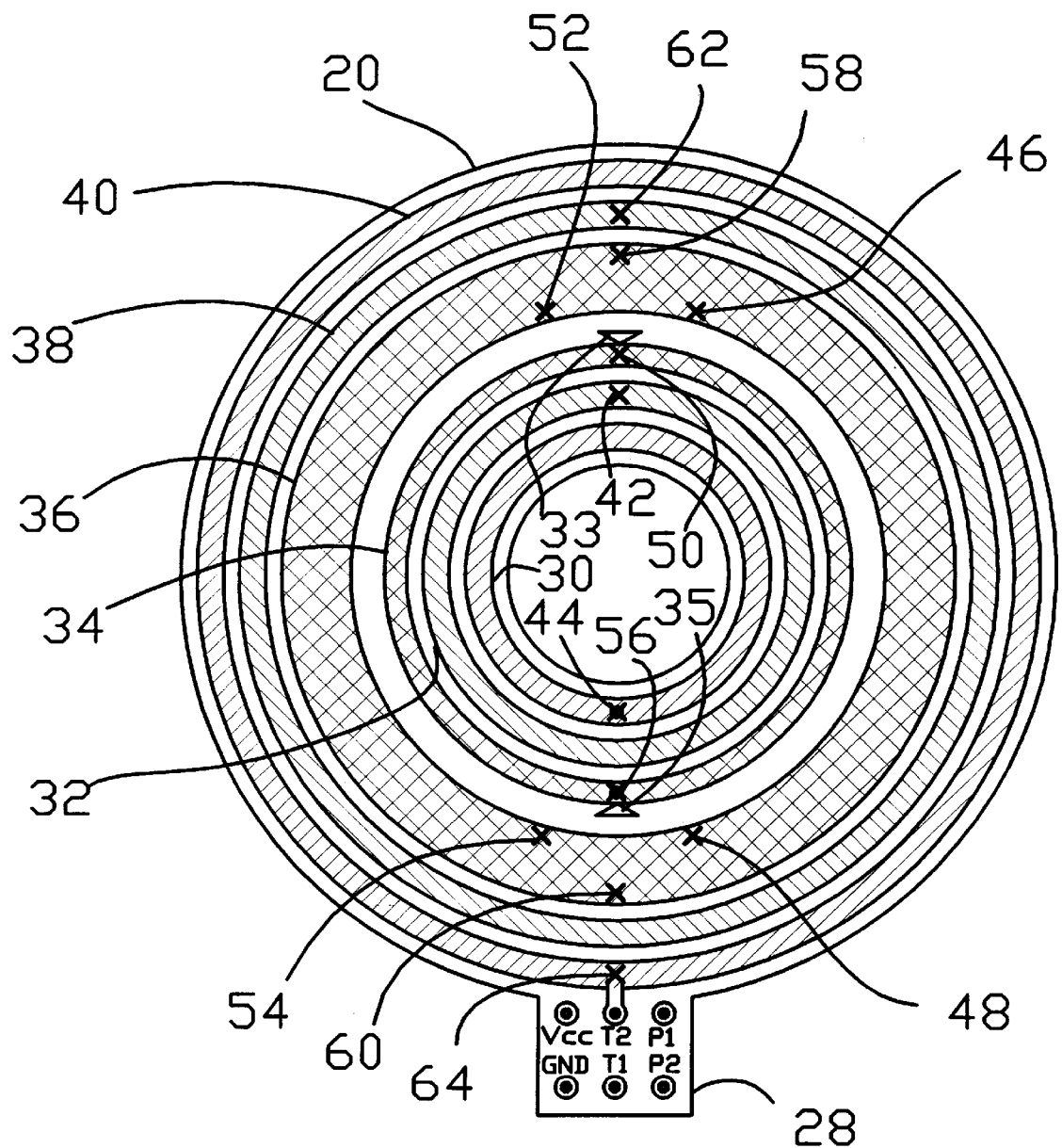
FIG. 3 is a plan view of a first side of the stationary disc component of the present invention, including conductive and resistive tracks formed along the surface of the disc.
Figure 4:
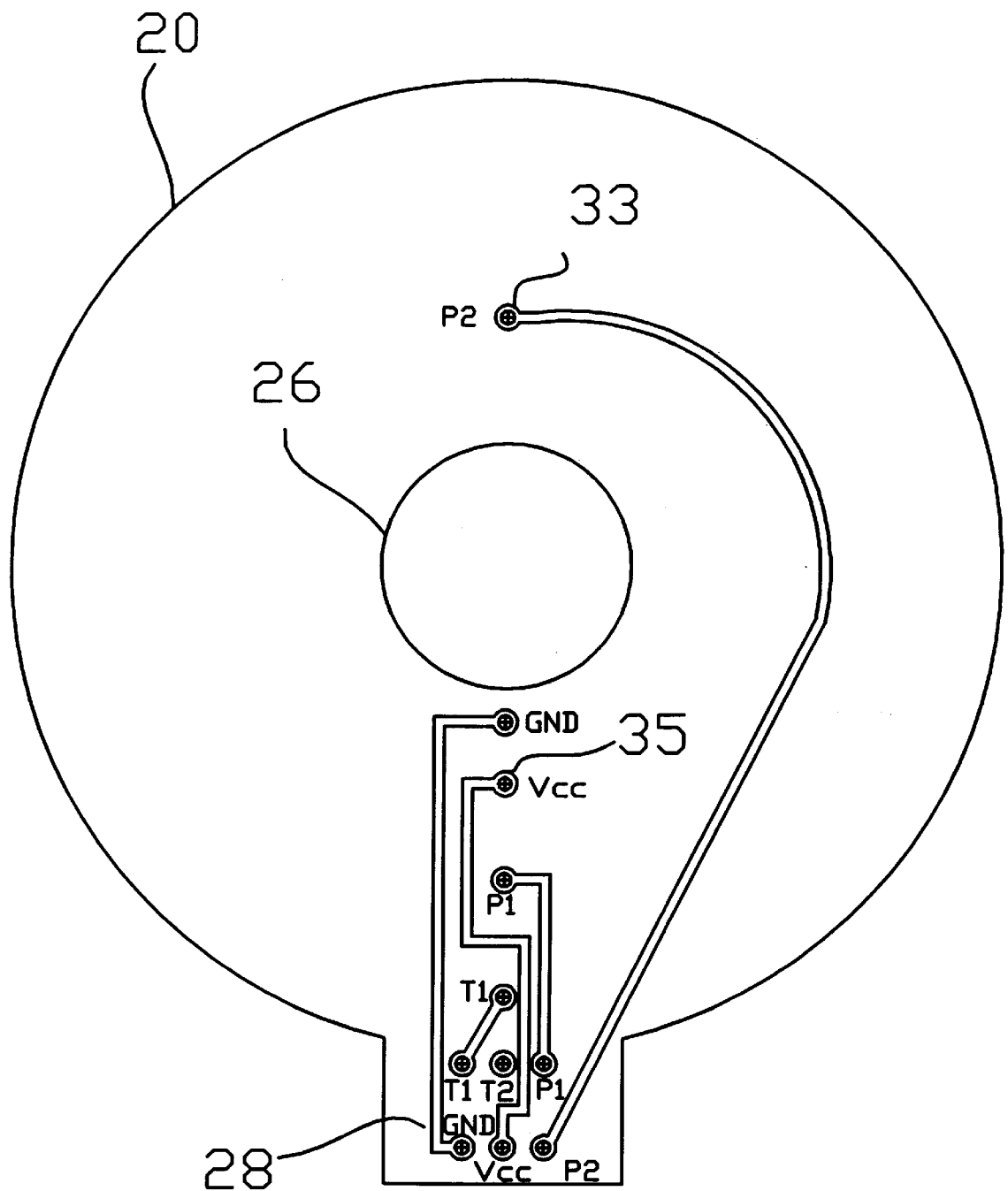
FIG. 4 is a plan view of the opposite side of the stationary disc of FIG. 3, showing input and output connections to the various tracks.

Turning now to FIGS. 3 and 4, plan views of the front and rear surfaces of stationary disc 20 are shown. Stationary disc 20 is formed with a center aperture 26 through which steering column 12 passes when sensor 10 is assembled. A small tab 28 extends from disc 20 and provides a number of connection points for various input and output signals for the sensor. These connection points include: $V_{cc}$; the input voltage to sensor 10; GND, the input ground reference for sensor 10; $T_1$, the first torque output signal from sensor 10; $T_2$, the second torque output from sensor 10; $P_1$, the first position output from sensor 10; and $P_2$, the second position output from sensor 10. A number of concentric circular tracks are formed on the front surface of disc 20. The innermost track being GND track 30, and the next innermost track being $V_{cc}$ track 32. Both GND track 30 and $V_{cc}$ track 32 are formed of a highly conductive material, such as silver or copper. As can best be seen in FIG. 3, these tracks are connected to the $V_{cc}$ and GND connection points on tab 28. When connected to an external power source, these connection points provide voltage and ground references which are distributed around tracks 30 and 32. $V_{cc}$ and GND tracks 30 and 32 supply a voltage reference and a ground reference to the remaining components of sensor 10 which are described in more detail below. Adjacent to $V_{cc}$ track 32 is position track 34. Position track 34 is formed of a resistive material, and has a constant linear resistance around its entire circumference. Two signal taps, 33 and 35 are tapped off position track 34 at points 180° apart. As can be seen in FIG. 3, taps 33 and 35 are connected to the P1 and P2 connection points on tab 28. Together P1 and P2 provide two position output signals from sensor 10. Just outside position track 34 lies torque track 36. Torque track 36 is used to generate two torque output signals T1 and T2, however there are no direct connections from tab 28 to torque track 36. The two outermost tracks comprise first and second torque output tracks 38 and 40. Both torque output tracks are made of a highly conductive material such as silver or copper, and are connected to the T1 and T2 connection points on tab 28. Together T1 and T2 provide two torque output signals from sensor 10. From the discussion thus far, it is clear that the present inventions provides a combination torque and position sensor which requires only six circular tracks on disc 20. From this reduced number of tracks the size of sensor is kept to a minimum.

Figure 5:
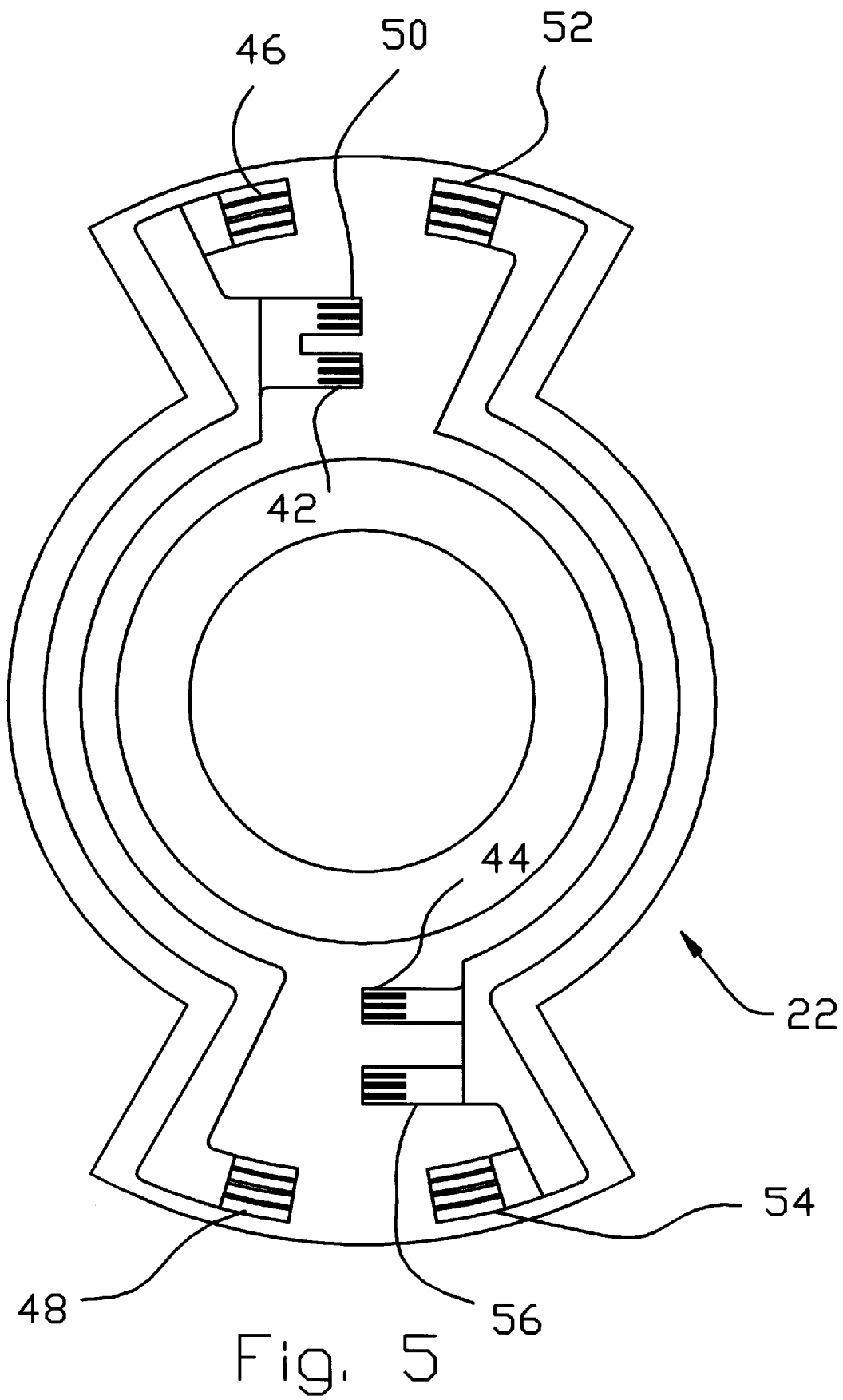
FIG. 5 is a plan view of the first rotor.
Figure 6:
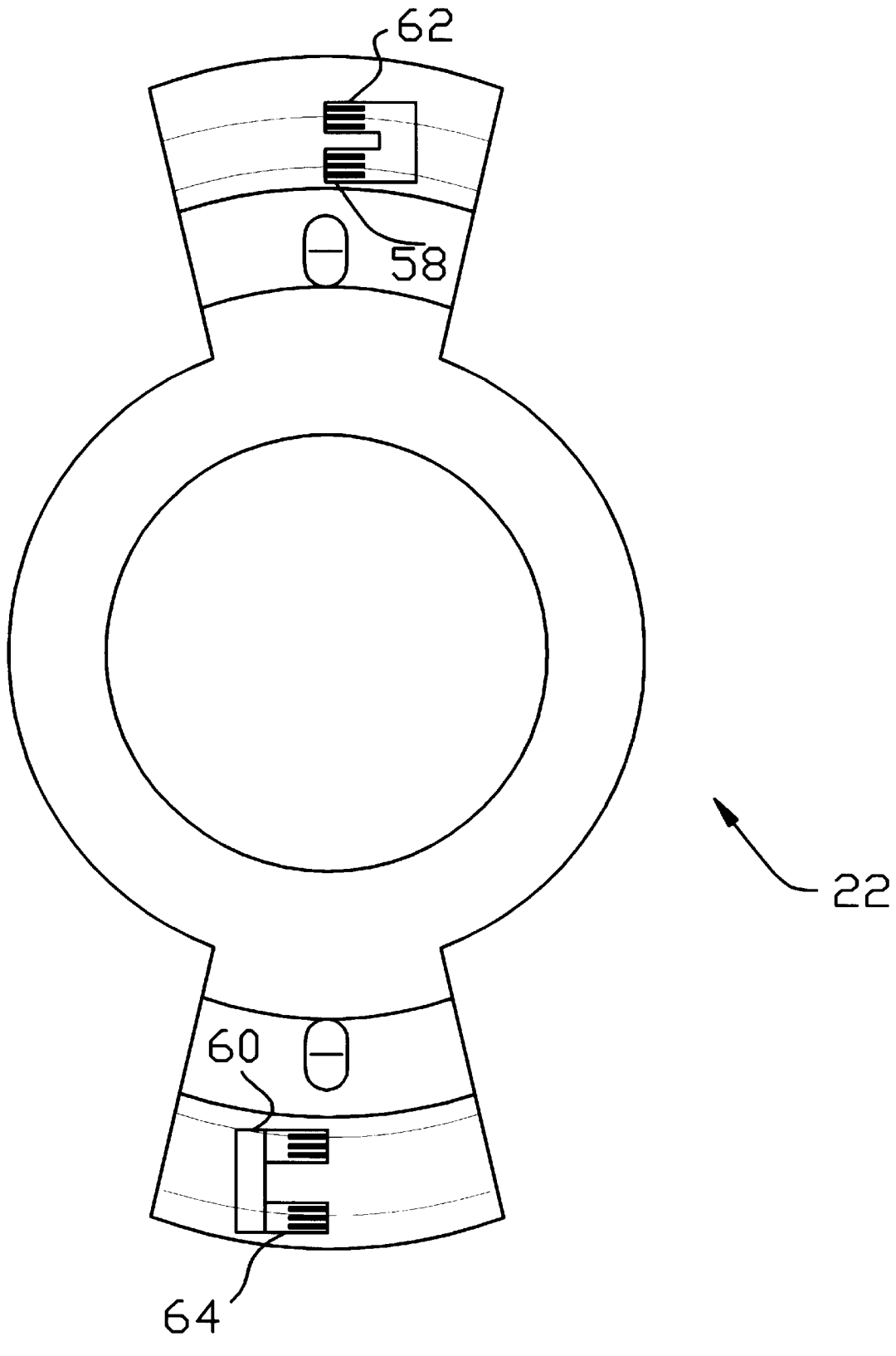
FIG. 6 is a plan view of the second rotor.

Turning now to FIGS. 3 and 5, first rotor 22 is described in its relation to stationary disc 20. (The rotating contacts described herein are mounted to first rotor 22 and second rotor 24, however, each contact is held in contact with one or another of the circular tracks on disc 20. The point of contact between the rotating contacts and the circular tracks are depicted in FIG. 2. The actual contacts themselves are shown in FIGS. 5 and 6.) First rotor 22 is rigidly affixed to first shaft 16 and rotates therewith. A series of electrical contacts protrude from first rotor 22 and when sensor 10 is assembled, these contacts physically engage the various tracks on stationary disc 20. $V_{cc}$ contact 42 engages $V_{cc}$ track 32, and GND contact 44 engages GND track 30. As first rotor 22 rotates with the steering column, these electrical contacts maintain physical contact with their respective tracks throughout the angular travel of first rotor 22. Thus, $V_{cc}$ contact 42 and GND contact 44 provide a voltage reference and ground reference to first rotor 22. $V_{cc}$ contact 42 is electrically connected to a number of other contacts mounted on first rotor 22 including: first torque signal reference contact 46, second torque signal reference contact 48, and position reference contact 50. GND contact 44 is also electrically connected to additional contacts mounted on first rotor 22, including: first torque ground reference contact 52, second torque ground reference contact 54, and position ground contact 56. When assembled, position reference contact 50 and position ground contact 56 physically engage position track 34, and rotate around position track 34 spaced 180° apart from one another. Also, when sensor 10 is assembled, both first and second torque signal reference contacts 46, 48, and both first and second torque ground reference contacts 52 and 54 physically engage torque track 36, and rotate around the torque track in fixed relation to one another. Of particular importance is the spacing between first torque signal reference contact 46 and first torque ground reference contact 52, as well as the spacing between second torque signal reference contact 48 and second torque ground reference contact 54. The spacing between these contacts represents the torque limits of sensor 10. Excessive torque applied to steering column 12 which causes relative motion between first and second shaft segments 16 and 4 in an amount greater than the angular displacement between first torque signal reference contact 46 and first torque ground reference contact 52, or between second torque signal reference contact 48 and second torque ground reference contact 56, will cause the sensor to malfunction.

Referring now to FIGS. 3 and 6, second rotor 24 and its relation to stationary disc 20 are now described. Second rotor 24 rigidly mounts to second shaft 14, and rotates with steering column 12. Four contacts extend from second rotor 24 to contact various tracks on stationary disc 20. When sensor 10 is assembled, first torque output contact 58 and second torque output contact 60 are held in physical contact with torque track 36 at positions diametrically opposed to one another. Furthermore, as seen in FIG. 3, first torque output contact 58 is positioned directly between first torque signal reference contact 46 and first torque ground reference contact 52. Second torque output contact 60 is positioned directly between second torque signal reference contact 48 and second torque ground reference contact 54. These six contacts rotate around torque track 36 in fixed relation to one another, the spacing between the contacts changing only when torque is applied to steering column 12. On second rotor 24 first torque output contact 58 is electrically connected to Torque 1 signal contact 62, and second torque output contact 60 is electrically connected to Torque 2 signal contact 64. Torque 1 signal contact 62 is held in physical contact with first torque output track 38, and Torque 2 signal contact 64 is held in physical contact with second torque output track 40.

Referring back to FIG. 3, connection points T1 and T2 on tab 28 represent the two torque signals to be output from sensor 10. T1 and T2 are connected electrically to first torque output track 38 and second torque output track 40 respectively. Torque output tracks 38 and 40 are both made of highly conductive materiel and receive a torque output voltage signal from Torque 1 signal output contact 62 and Torque 2 signal output contact 64 respectively. Torque 1 and Torque 2 signal output contacts 62 and 64 are in turn connected to first torque output contact 58 and second torque output contact 60. Thus, conductive paths run directly from first torque output contact 58 and second torque output contact 60 to output connection points T1 and T2 respectively. In other words, the voltage signals present at first and second torque output contacts 58, 60 serve as the torque output signals T1 and T2 output from sensor 10.

The voltage signal on first torque output contact 58 is derived from first torque signal reference contact 46 and first torque ground reference contact 52. These three contacts rotate around torque track 36 in unison. The linear resistance of torque track 36 which separates first torque signal reference contact 46 from first torque output contact 58, and first torque output contact 58 from first torque ground reference contact 52 acts as a voltage divider. With no torque applied to steering column 12, first and second shafts 16, 14 are at rest relative to one another. First torque output contact 58 is approximately half way between first torque signal reference contact 46 and first torque ground reference contact 52, and the voltage signal on first torque output contact 58 is approximately one half of $V_{cc}$. When torque is applied to steering column 12, first and second shafts 16, 14 rotate slightly relative to one another. Since first torque signal reference contact 46 and first torque ground reference contact 52 rotate with first shaft 16, and since first torque output contact 58 rotates with second shaft 14, the relative motion of the two shafts will cause first torque output contact 58 to move relative to first torque signal reference contact 46 and first torque ground reference contact 52. Depending on the direction of the torque applied, first torque output contact 58 will move either closer to or further away from first torque signal reference contact 46. As first torque output contact 58 moves closer to first torque signal reference contact 46, the output voltage signal increases towards $V_{cc}$. Conversely, as torque is applied in the opposite direction, first torque output contact 58 is forced away from first torque signal reference contact 46, and the output voltage signal decreases towards the ground potential of first torque ground reference contact 52. Thus, the output signal T1 is proportional to the amount of torque applied to steering column 12.

Output signal T2 is derived in the exact same way as output signal T1, but using second torque signal reference contact 48, second torque ground reference contact 54, and second torque output contact 60. However, since the second group of contacts are aligned as the mirror image of the first set of contacts, torque which causes first torque output contact 58 to move towards first torque signal reference contact 46 will cause second torque output contact 60 to move away from second torque signal reference contact 48. In other words, the slope of output signals T1 and T2 will be opposite one another.

It should be noted that torque output T1 is derived from the relative spacing between first torque signal reference contact 46, first torque ground reference contact 52, and first torque output contact 58, and torque output T2 is derived from the relative spacing between second torque signal reference contact 48, second torque ground reference contact 54, and second torque output contact 60. The output signal are generated as the contacts rotate around a circular resistive track. The zero point between the reference contacts and the output contacts is governed by the geometry of the two rotors, not the dimensions of the resistive track. Thus, the zero point is established by the mechanical assembly of the rotors, and there is no need to trim the resistive track to adjust the zero point. Controlling the zero balance is much easier to accomplish mechanically than by trimming resistive arcs on the assembled rotors. The present invention therefore provides a torque sensor witch is much easier and less expensive to manufacture.

Connection points P1 and P2 on tab 28 represent the two position signals to be output from sensor 10. P1 and P2 are connected to signal taps 33 and 35 respectively, thus the position signals output from sensor 10 represent the voltage present on position track 34 at the points where taps 33 and 35 are connected. On first rotor 22, position reference contact 50 is electrically connected to $V_{cc}$, and position ground contact 56 is connected to ground potential. These contacts are held in physical contact with position track 34, and rotate around the track as steering column 12 rotates from side to side. Since taps 33 and 35 are stationary, the position reference contact 50 and position ground contact 56 will be continually moving toward or away from taps 33 and 35. Position track 34 is made of a resistive material and has a constant linear resistance. As the distance between the rotating contacts 50 and 56 and taps 33 and 35 change, the voltage drop between the contacts and the taps will change as well. For example, as position reference contact 50 moves closer to tap 33, the voltage drop between the contact and the tap grows less and less. The voltage measured at tap 33 (P1)

increases until position reference contact 50 is aligned with tap 33 at which time the P1 voltage signal equals $V_{cc}$. If the steering column is rotated further position reference contact 50 begins to move away from tap 33, and the voltage signal P1 begins to drop accordingly, until finally, position ground contact 56 is adjacent to tap 33 and the voltage signal P1 is at ground potential. Thus, as position reference contact 50 and position ground contact 56 continue to rotate around position track 34, a triangular wave form is generated on output signal P1 depending on the position of steering column 12. The identical position waveform is generated on output signal P2, however, since tap 35 is 180° away from tap 33, the output waveform on P2 will be 180° out of phase with the signal on P1. From this discussion it should be clear to one of ordinary skill in the art that any number of position signals could be generated from one position track depending only on how many taps are connected to the track. The phase angle difference between such signals being determined by the geometric angle between taps connected around position track 34. In this manner, a multitude of position signals can be obtained from a single position track. Sensing position in this manner has the advantage over prior art sensors in that it eliminates the need for an additional position output track for each position signal output from the sensor. Eliminating these additional output tracks allows the present sensor to be made much smaller than the prior art devices.

It should be understood that various changes and modifications to the presently preferred embodiments described herein will be apparent to those skilled in the art. Such changes and modifications may be made without departing from the spirit and scope of the present invention and without diminishing its attendant advantages. For example, an embodiment of the invention may be provided with only a position track for sensing the position of a rotating shaft, without including the torque sensing functions. Likewise, another embodiment could be supplied having only the torque sensing features described above. Either case would be considered within the scope of the present invention. It is, therefore, intended that such changes and modifications be covered by the appended claims.

What is claimed is:

1. A torque sensor for measuring the torque applied to a rotatable shaft, said sensor comprising:

a fixed disc formed of a non-conducting insulating material;

a circular resistive track disposed around a surface of said disc;

an input voltage supply contact and a first ground contact in fixed relation to one another held in rotatable contact with said resistive track; and a torque signal output contact held in rotatable contact with said resistive track and being disposed between said voltage supply contact and said ground contact such that torque applied to said shaft alters the relative position between said output contact and said voltage supply and ground contacts, said output contact providing an output voltage signal proportional to the amount of torque applied to said shaft.

2. The torque sensor of claim 1 wherein said rotatable shaft comprises a first shaft and a second shaft, said first and second shafts being in rigidly coupled by a compliant torsion bar disposed therebetween.

3. The torque sensor of claim 2 further comprising:

a first rotor fixedly attached to said first shaft, said torque signal output contact extending from said first rotor; and a second rotor fixedly attached to said second shaft, voltage supply contact and said ground contact extending from said second rotor.

4. The torque sensor of claim 1 further comprising:

a circular power track and a circular ground track disposed around a surface of said disc, said power and ground tracks being formed of a highly conductive material;

a rotor fixedly attached to said shaft, with a power contact and a second ground contact extending therefrom, said power and second ground contacts being held in rotatable contact with said power and ground tracks, said voltage supply contact being electrically connected to said power contact, and said second ground contact being electrically connected to said first ground contact.

5. The torque sensor of claim 1 having a circular output track formed of a highly conductive material formed on a surface of said disc, said output track being electrically connected to said output voltage signal.

6. The torque sensor of claim 1 having two said torque signal outputs, both said output signals providing a voltage signal proportional to the amount of torque applied, but said voltage signals having opposite slopes.

7. A position sensor for measuring the position of a rotatable shaft, said sensor comprising:

a fixed disc formed of a non-conducting insulating material;

a circular resistive position track disposed around a surface of said disc;

a first input voltage supply contact and a first ground contact held in rotatable contact with said resistive track; and at least one position signal output contact electrically connected said position track, said output contact providing an output voltage signal proportional to the angular position of said shaft.

8. The position sensor of claim 7 further comprising:

a rotor fixedly attached to said shaft, said voltage and ground contacts extending from said rotor.

9. The position sensor of claim 8 further comprising:

a circular power track and a circular ground track disposed around a surface of said disc, said power and ground tracks being formed of a highly conductive material;

a second input voltage supply contact and a second ground contact extending from said rotor and being held in rotatable contact with said power and ground tracks, said first voltage supply contact being electrically connected to said second voltage supply contact, and said second ground contact being electrically connected to said first ground contact.

10. The position sensor of claim 7 wherein said output voltage signal comprises a triangular wave form corresponding to the angular position of the shaft.

11. The position sensor of claim 7 having a plurality of said position signal output contacts providing a plurality of said output voltage signal, said output voltage signals comprising identical waveforms and having a phase angle difference corresponding to the position of said signal output contacts.

12. A combination torque and position sensor for measuring the torque applied to, and the position of, a rotatable shaft, said combination sensor comprising:

a fixed disc formed of a non-conducting insulating material;

a circular resistive position track and a circular resistive torque track disposed around a surface of said disc;

a first input voltage supply contact and a first ground contact in fixed relation to one another held in rotatable contact with said torque track; and a torque signal output contact held in rotatable contact with said torque track and being disposed between said first voltage supply contact and said first ground contact such that torque applied to said shaft alters the relative position between said torque output contact and said first voltage supply and first ground contacts, said torque output contact providing an output voltage signal proportional to the amount of torque applied to said shaft;

a second input voltage supply contact and a second ground contact held in rotatable contact with said position track; and at least one position signal output contact electrically connected said position track, said position signal output providing an output voltage signal proportional to the angular position of said shaft.

13. The combination sensor of claim 12 wherein said rotatable shaft comprises a first shaft and a second shaft, said first and second shafts being rigidly coupled by a compliant torsion bar disposed therebetween.

14. The combination sensor of claim 13 further comprising:

a first rotor fixedly attached to said first shaft, said torque signal output contact extending from said first rotor; and a second rotor fixedly attached to said second shaft, said voltage supply contact and said ground contact extending from said second rotor.

15. The combination sensor of claim 12 further comprising:

a circular power track and a circular ground track disposed around a surface of said disc, said power and ground tracks being formed of a highly conductive material;

a rotor fixedly attached to said shaft, with a power contact and a second ground contact extending therefrom, said power and second ground contacts being held in rotatable contact with said power and ground tracks, said first input voltage supply contact being electrically connected to said power contact, and said second ground contact being electrically connected to said first ground contact.

\* \* \* \* \*